US009246194B2

(12) United States Patent
Min et al.

(10) Patent No.: US 9,246,194 B2
(45) Date of Patent: Jan. 26, 2016

(54) DEVICE FOR FOLDING ELECTRODE ASSEMBLY

(75) Inventors: Kihong Min, Gwacheon-si (KR); Sung-Min Hwang, Cheongju-si (KR); Jihoon Cho, Daejeon (KR); Changmin Han, Cheongwon-gun (KR); Kihun Song, Hwaseong-si (KR); Sang Hyuck Park, Suwon-si (KR); Hansung Lee, Incheon (KR); Byeong Geun Kim, Anyang-si (KR); Jae Hoon You, Cheongju-si (KR); Byung Taek Yang, Cheongju-si (KR); Hyeong Kim, Daegu (KR); Sunghyun Kim, Tongyeong-si (KR)

(73) Assignee: LG CHEM, LTD., Seoul (KR)

( * ) Notice: Subject to any disclaimer, the term of this patent is extended or adjusted under 35 U.S.C. 154(b) by 254 days.

(21) Appl. No.: 13/809,599

(22) PCT Filed: Jul. 13, 2011

(86) PCT No.: PCT/KR2011/005132
§ 371 (c)(1),
(2), (4) Date: Jun. 11, 2013

(87) PCT Pub. No.: WO2012/008743
PCT Pub. Date: Jan. 19, 2012

(65) Prior Publication Data
US 2013/0260199 A1    Oct. 3, 2013

(30) Foreign Application Priority Data

Jul. 14, 2010   (KR) ...................... 10-2010-0067740

(51) Int. Cl.
| | |
|---|---|
| *H01M 10/05* | (2010.01) |
| *H01M 10/0587* | (2010.01) |
| *H01M 10/0585* | (2010.01) |
| *B65H 23/195* | (2006.01) |
| *H01M 10/04* | (2006.01) |

(Continued)

(52) U.S. Cl.
CPC ....... *H01M 10/0587* (2013.01); *B65H 23/1955* (2013.01); *H01M 10/0404* (2013.01);

(Continued)

(58) Field of Classification Search
USPC ................................. 29/623.1, 700
See application file for complete search history.

(56) References Cited

U.S. PATENT DOCUMENTS

| | | |
|---|---|---|
| 4,590,812 A | 5/1986 | Brackett |
| 4,779,472 A | 10/1988 | Brackett |
| 2007/0184350 A1 | 8/2007 | Kim et al. |

FOREIGN PATENT DOCUMENTS

| | | |
|---|---|---|
| CN | 101719561 A | 6/2010 |
| JP | 6-168736 A | 6/1994 |

(Continued)

OTHER PUBLICATIONS

International Search Report issued in PCT/KR2011/005132, mailed on Mar. 20, 2012.

(Continued)

*Primary Examiner* — Ula C Ruddock
*Assistant Examiner* — Frank Chernow
(74) *Attorney, Agent, or Firm* — Birch, Stewart, Kolasch & Birch, LLP

(57) ABSTRACT

Disclosed herein is a folding device to manufacture a stacked/folded type electrode assembly having unit cells sequentially stacked in a state in which a separation film is disposed between the respective unit cells, the folding device including a web supply unit to supply a web having plate-shaped unit cells arranged at the top of a separation film at predetermined intervals, a winding jig to rotate the unit cells while holding a first one of the unit cells of the web so that the unit cells are sequentially stacked in a state in which the separation film is disposed between the respective unit cells, and a Y-axis directional rotary shaft compensation unit to compensate for a position of a rotary shaft of the winding jig in a direction (Y-axis direction) perpendicular to an advancing direction of the web, wherein the Y-axis directional rotary shaft compensation unit periodically changes the position of the rotary shaft in the direction (Y axis) perpendicular to the advancing direction (X axis) of the web to minimize vertical amplitude of the web during winding.

12 Claims, 10 Drawing Sheets

(51) Int. Cl.
*H01M 10/052* (2010.01)
*H01M 10/0583* (2010.01)

(52) U.S. Cl.
CPC ...... *H01M10/0459* (2013.01); *H01M 10/0585* (2013.01); *B65H 2701/1942* (2013.01); *B65H 2801/72* (2013.01); *H01M 10/052* (2013.01); *H01M 10/0583* (2013.01); *Y10T 29/53135* (2015.01)

(56) References Cited

FOREIGN PATENT DOCUMENTS

| | | | |
|---|---|---|---|
| JP | 11-40144 | A | 2/1999 |
| JP | 200-12085 | A | 1/2000 |
| JP | 2001-243971 | A | 9/2001 |
| JP | 2003-146538 | A | 5/2003 |
| JP | 2007-194130 | A | 8/2007 |
| KR | 10-2001-0082058 | A | 8/2001 |
| KR | 10-2001-0082059 | A | 8/2001 |
| KR | 2003-0086069 | A | 11/2003 |
| KR | 20-0341487 | Y1 | 2/2004 |
| KR | 10-0497147 | B1 | 6/2005 |
| KR | 10-2007-0110568 | A | 11/2007 |
| KR | 10-0859996 | B1 | 9/2008 |
| KR | 10-2009-0008075 | A | 1/2009 |
| WO | WO 2009/078632 | A2 | 6/2009 |

OTHER PUBLICATIONS

European Office Action dated Jun. 10, 2015.

DEVICE FOR FOLDING ELECTRODE ASSEMBLY

TECHNICAL FIELD

The present invention relates to a device for folding an electrode assembly, and more particularly to a folding device to manufacture a stacked/folded type electrode assembly having unit cells sequentially stacked in a state in which a separation film is disposed between the respective unit cells, the folding device including a web supply unit to supply a web having plate-shaped unit cells arranged at the top of a separation film at predetermined intervals, a winding jig to rotate the unit cells while holding a first one of the unit cells of the web so that the unit cells are sequentially stacked in a state in which the separation film is disposed between the respective unit cells, and a Y-axis directional rotary shaft compensation unit to compensate for a position of a rotary shaft of the winding jig in a direction (Y-axis direction) perpendicular to an advancing direction of the web, wherein the Y-axis directional rotary shaft compensation unit periodically changes the position of the rotary shaft in the direction (Y axis) perpendicular to the advancing direction (X axis) of the web to minimize vertical amplitude of the web during winding.

BACKGROUND ART

As mobile devices have been increasingly developed, and the demand for such mobile devices has increased, the demand for secondary batteries has also sharply increased as an energy source for the mobile devices. Among such secondary batteries is a lithium secondary battery having high energy density and high discharge voltage, on which much research has been carried out and which is now commercialized and widely used.

Based on the appearance thereof, a lithium secondary battery may be classified as a cylindrical battery, a prismatic battery, or a pouch-shaped battery. Based on the kind of an electrolyte, a lithium secondary battery may be also classified as a lithium ion battery, a lithium ion polymer battery, or a lithium polymer battery.

A recent trend in the miniaturization of mobile devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

Generally, a pouch-shaped battery is a battery having an electrode assembly and an electrolyte disposed in a pouch-shaped battery case, formed of a laminate sheet including a resin layer and a metal layer, in a sealed state. The electrode assembly mounted in the battery case is configured in a jelly-roll (wound) type structure, a stacked type structure, or a combination (stacked/folded) type structure. A pouch-shaped battery is manufactured by forming a receiving part, in which an electrode assembly will be mounted, at a laminate sheet and thermally welding the laminate sheet or another sheet separated from the laminate sheet or extending from the laminate sheet in a sealing fashion in a state in which an electrode assembly is mounted in the receiving part.

Meanwhile, a stacked/folded type electrode assembly is manufactured through a notching process, a lamination process, a folding process, a packaging process, and degas process, which are sequentially performed.

In the folding process to wind plate-shaped unit cells in a state in which a separation film is disposed between the unit cells so that the unit cells are sequentially stacked, if the velocity of a winding jig is increased to improve process efficiency, the winding jig, which winds the plate-shaped unit cells, flutters or severely shakes in a direction, i.e. an Y-axis direction, perpendicular to an X-axis direction, which is an advancing direction of a web with the result that electrode active material may be separated from the unit cells or dust may be generated.

In order to solve the above problem, therefore, there is a high necessity for a folding device having a specific structure to manufacture a stacked/folded type electrode assembly.

DISCLOSURE

Technical Problem

Therefore, the present invention has been made to solve the above problems, and other technical problems that have yet to be resolved.

Specifically, it is an object of the present invention to provide a folding device wherein a Y-axis directional rotary shaft compensation unit to compensate for the position of a rotary shaft of a winding jig in a Y-axis direction is included to prevent separation of electrode active materials from unit cells or generation of dust during a folding process to improve process efficiency, thereby manufacturing an electrode assembly with improved quality.

Technical Solution

In accordance with one aspect of the present invention, the above and other objects can be accomplished by the provision of a folding device to manufacture a stacked/folded type electrode assembly having unit cells sequentially stacked in a state in which a separation film is disposed between the respective unit cells, the folding device including a web supply unit to supply a web having plate-shaped unit cells arranged at the top of a separation film at predetermined intervals, a winding jig to rotate the unit cells while holding a first one of the unit cells of the web so that the unit cells are sequentially stacked in a state in which the separation film is disposed between the respective unit cells, and a Y-axis directional rotary shaft compensation unit to compensate for a position of a rotary shaft of the winding jig in a direction (Y-axis direction) perpendicular to an advancing direction of the web, wherein the Y-axis directional rotary shaft compensation unit periodically changes the position of the rotary shaft in the direction (Y axis) perpendicular to the advancing direction (X axis) of the web to minimize vertical amplitude of the web during winding.

Since the folding device according to the present invention includes the Y-axis directional rotary shaft compensation unit to compensate for the position of the rotary shaft of the winding jig in the direction (Y-axis direction) perpendicular to the advancing direction of the web, it is possible to periodically changes the position of the rotary shaft in the direction (Y axis) perpendicular to the advancing direction (X axis) of the web, thereby minimizing vertical amplitude of the web during winding.

Preferably, the unit cells are bicells or full cells.

Constructions of the bicells and the full cells and a method of manufacturing an electrode assembly using the same are disclosed in Korean Patent Application Publication No. 2001-0082058, No. 2001-0082059 and No. 2001-0082060, which have been filed in the name of the applicant of the present patent application.

A full cell as a unit cell is a cell having a unit structure of cathode/separator/anode. That is, a full cell is a cell having a cathode and an anode located at opposite sides thereof. The full cell may have a unit structure of cathode/separator/anode/separator/cathode/separator/anode in addition to the unit structure of cathode/separator/anode. In order to configure a secondary battery using a plurality of full cells, the full cells must be staked in a state in which a separation film is disposed between the respective full cells so that cathodes and anodes of the full cells face each other.

Also, a bicell as a unit cell is a cell having the same electrodes located at opposite sides thereof. For example, the bicell may have a unit structure of cathode/separator/anode/separator/cathode or a unit structure of anode/separator/cathode/separator/anode. In this specification, a cell having a structure of cathode/separator/anode/separator/cathode is referred to as a 'C type bicell', and a cell having a structure of anode/separator/cathode/separator/anode is referred to as an 'A type bicell'. That is, a cell having cathodes located at opposite sides thereof is referred to as a C type bicell, and a cell having anodes located at opposite sides thereof is referred to as an A type bicell.

The number of cathodes, anodes, and separators constituting a bicell is not particularly restricted so long as the bicell has the same electrodes located at opposite sides thereof. In order to configure a secondary battery using a plurality of bicells, the bicells must be staked in a state in which a separation film is disposed between the respective bicells so that C type bicells and A type bicells face each other.

A full cell and a bicell are manufactured by coupling a cathode and an anode in a state in which a separator is disposed between the cathode and an anode. A preferred example of such a coupling method is a thermal welding method.

In the full cell and the bicell, for example, the cathode is prepared by applying, drying, and pressing a mixture of a cathode active material, a conductive agent, and a binder to opposite major surfaces of a cathode current collector. A filler may be added to the mixture as needed.

Generally, the cathode current collector has a thickness of 3 to 500 μm. The cathode current collector is not particularly restricted so long as the cathode current collector exhibits high conductivity while the cathode current collector does not induce any chemical change in the battery to which it is applied. For example, the cathode current collector may be made of stainless steel, aluminum, nickel, titanium or plastic carbon. Alternatively, the cathode current collector may be made of aluminum or stainless steel the surface of which is treated with carbon, nickel, titanium, or silver. The cathode current collector may have a micro uneven pattern formed at the surface thereof so as to increase adhesive strength of the cathode active material. The cathode current collector may be configured in various forms, such as a film, a sheet, a foil, a net, a porous body, a foam body, and a non-woven fabric body.

The cathode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where, x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where, M=Co, Mn, Al, Cu, Fe, Mg, B, or Ga, and x=0.01 to 0.3); a lithium manganese composite oxide represented by a chemical formula $LiMn_{2-x}M_xO_2$ (where, M=Co, Ni, Fe, Cr, Zn, or Ta, and x=0.01 to 0.1) or a chemical formula $Li_2Mn_3MO_8$ (where, M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 50 weight % based on the total weight of the compound including the cathode active material. The conductive agent is not particularly restricted so long as the conductive agent exhibits high conductivity while the conductive agent does not induce any chemical change in the battery to which it is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 50 weight % based on the total weight of the compound including the cathode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the cathode. There is no particular limit to the filler so long as it does not cause chemical changes in the battery to which it is applied and is made of a fibrous material. As examples of the filler, there may be used olefin polymers, such as polyethylene and polypropylene; and fibrous materials, such as glass fiber and carbon fiber.

On the other hand, the anode is prepared by applying, drying and pressing an anode active material to an anode current collector. The conductive agent, the binder and the filler, which were previously described, may be selectively added to the anode active material as needed.

Generally, the anode current collector has a thickness of 3 to 500 μm. The anode current collector is not particularly restricted so long as the anode current collector exhibits high conductivity while the anode current collector does not induce chemical changes in the battery to which it is applied. For example, the anode current collector may be made of copper, stainless steel, aluminum, nickel, titanium, or plastic carbon. Alternatively, the anode current collector may be made of copper or stainless steel the surface of which is treated with carbon, nickel, titanium, or silver or an aluminum-cadmium alloy. In the same manner as in the cathode current collector, the anode current collector may have a micro uneven pattern formed at the surface thereof so as to increase adhesive strength of the anode active material. The anode current collector may be configured in various forms, such as a film, a sheet, a foil, a net, a porous body, a foam body, and a non-woven fabric body.

As the anode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is disposed between the cathode and the anode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In a case in which a solid electrolyte, such as polymer, is used as an electrolyte, the solid electrolyte may function as a separator. The separation film used in the present invention may be formed of the same material as the separator or a material different from the separator.

When the stacked/folded electrode assembly is configured using the full cells or the bicells with the above-stated construction as unit cells, the unit cells may be disposed on the separation film so that the separation film has a spaced region having a length corresponding to a size of each of the unit cells since no unit cell is arranged at a region of the separation film adjacent to a first one of the unit cells, and the spaced region wraps a front surface and a rear surface of the first one of the unit cells during folding to maintain electrical separation between the respective unit cells.

First, unit cells are arranged on a long sheet type continuous separation film. When the separation film is sequentially folded in the longitudinal direction of the separation film to stack the unit cells, an electrode assembly is manufactured to have a structure in which electrical isolation between the unit cells is achieved by the separation film.

In a preferred example, in a case in which an electrode assembly is manufactured using bicells, the bicells may be disposed on the separation film so that different types of bicells are adjacent to each other at the lower end of each of the bicells, thereby manufacturing an electrode assembly having a structure of cathode/anode/cathode/anode. The separation film may have a spaced region having a length corresponding to a size of each of the unit cells so that no unit cell is arranged at a region of the separation film adjacent to a first one of the unit cells, and the spaced region wraps the front surface of the first one of the unit cells during folding to maintain electrical separation between the respective unit cells. In this specification, a main surface of a unit cell contacting a separation film when the unit cell is placed on the separation film before folding is defined as a rear surface, and the other main surface of the unit cell is defined as a front surface.

In another preferred example, in a case in which an electrode assembly is manufactured using full cells, the full cells may be disposed on the separation film so that different electrode surfaces face the same surface (front surface) at the lower end of each of the full cells, thereby manufacturing an electrode assembly having a structure of cathode/anode/cathode/anode. The separation film may have a spaced region having a length corresponding to a size of each of the unit cells so that no unit cell is arranged at a region of the separation film adjacent to a first one of the unit cells, and the spaced region wraps the front surface of the first one of the unit cells during folding to maintain electrical separation between the respective unit cells.

In a preferred example, when the unit cells, such as the full cells or the bicells, are placed on the separation film, the unit cells maybe attached to the separation film for easy folding. Such attachment may be achieved by thermal welding.

In the folding device according to the present invention, the structure of the winding jig is not particularly restricted so long as the winding jig is configured to fixedly hold the first unit cell of the web. For example, the winding jig may be configured to fixedly hold the web at the upper end of one of the unit cells and the lower end of the separation film corresponding to one of the unit cells.

In a preferred example, when the upward or downward position of the web is changed, the Y-axis position of the rotary shaft may be changed in a direction to offset the change, thereby eliminating vertical amplitude of the web during winding. The web may periodically shake or flutter in the Y-axis direction. Consequently, the Y-axis position of the rotary shaft may also be periodically changed based on such change of the web.

According to circumstances, the folding device may further include an X-axis directional rotary shaft compensation unit to compensate for the position of the rotary shaft of the winding jig in the advancing direction of the web (X-axis direction).

As an example of the structure, the X-axis directional rotary shaft compensation unit may periodically change the position of the rotary shaft to compensate for the change in X-axis velocity Vx of the web caused during winding of the plate-shaped unit cells, thereby uniformly maintaining tension of the web.

Specifically, Vx is velocity at the web supply unit. The X-axis velocity at the web supply unit must be uniform to uniformly maintain tension between the web supply unit and the winding jig.

For example, theoretically calculated compensation amount to compensate for the change in X-axis velocity Vx of the web may apparently appear as a function having a period of 180 degrees. Actually, however, a point which cannot be differentiated, i.e. a point having a different inclination value, occurs around 180 degrees. A differential value of displacement is velocity, and therefore, a point at which velocity is abruptly changed occurs. As a result, acceleration is abruptly changed as shown in FIG. 7, resulting in the increase of a jerk.

This occurs since the winding jig or the unit cell does not perform a rotational motion in a cylindrical shape but in a plate shape. That is, the X-axis velocity Vx of the web generated during winding may theoretically be proportional to sin θ. Actually, however, the maximum value does not appear when θ=90 degrees but when θ=about 80 degrees. This is because the maximum value is obtained at a portion tangent to a circle performing a rotational motion.

In a case in which the winding jig is compensated for in the X-axis direction based on the theoretically calculated compensation amount, therefore, excessive load is applied to the device if the process is carried out at more than a predetermined velocity with the result that it is necessary to change the design of the rotary shaft compensation unit so that the rotary shaft compensation unit has higher torque.

On the other hand, in a case in which the theoretically calculated compensation amount is changed into a periodic function having a similar displacement value, while a point which cannot be differentiated does not occur. In addition, no excessive load is applied to the device even if the rotational velocity is increased, and it is possible to improve process efficiency without change of design. Referring to FIG. 8, differentiation is possible at every position of the compensation amount graph, and both the velocity and acceleration graphs are continuous. Also, the jerk does not deviate from a predetermined range.

The compensation in X-axis directional position and the compensation in Y-axis directional position of the rotary shaft of the winding jig may be simultaneously performed.

In this case, the compensation in position of the rotary shaft of the winding jig may be performed in an oval shape in which an X-axis direction is the major axis and a Y-axis direction is the minor axis during winding.

Both the Y-axis directional rotary shaft compensation unit and the X-axis directional rotary shaft compensation unit may be used so long as the Y-axis directional rotary shaft compensation unit and the X-axis directional rotary shaft compensation unit can compensate for vertical change amount. Preferably, the Y-axis directional rotary shaft compensation unit and the X-axis directional rotary shaft compensation unit are configured to have an interconnected variable rotation structure.

A preferred example of the variable rotation structure may include a rotary eccentric roller and a variable crank to convert a rotational motion of the eccentric roller into a rectilinear motion.

In accordance with another aspect of the present invention, there is provided a secondary battery including the stacked-folded type electrode assembly manufactured using the folding device with the above-stated construction.

A representative example of the secondary battery may be a lithium secondary battery using lithium ions as a medium.

A lithium salt-containing, non-aqueous electrolyte is composed of a non-aqueous electrolyte and lithium. As the non-aqueous electrolyte, a non-aqueous electrolytic solution, solid electrolyte, or inorganic solid electrolyte may be used.

As examples of the non-aqueous electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides and sulphates of lithium, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

Additionally, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. According to circumstances, in order to impart incombustibility, the non-aqueous electrolyte may further include halogen-containing solvents, such as carbon tetrachloride and ethylene trifluoride. Furthermore, in order to improve high-temperature storage characteristics, the non-aqueous electrolyte may additionally include carbon dioxide gas.

Meanwhile, a lithium secondary battery may be classified as a cylindrical battery, a prismatic battery, or a pouch-shaped battery based on the shape of an electrode assembly and the structure and shape of a battery case. Among them, the present invention may be properly applied to the pouch-shaped battery, which has problems during folding.

As previously described, the pouch-shaped battery is a battery having an electrode assembly mounted in a pouch-shaped battery case, formed of a laminate sheet including a metal layer and a resin layer. Generally, a case formed of an aluminum laminate sheet is widely used.

A method of manufacturing a secondary battery using the electrode assembly is well known in the art to which the present invention pertains, and therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
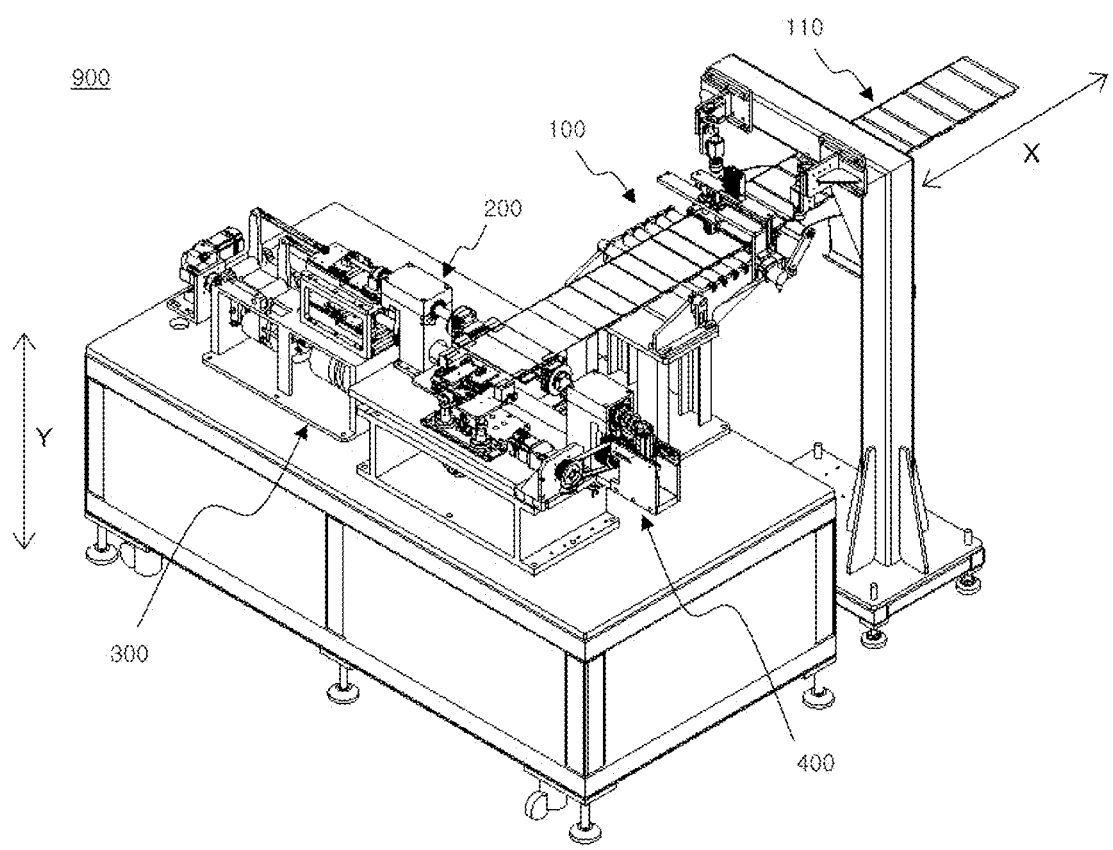
FIG. 1 is a perspective view showing a folding device according to an embodiment of the present invention.

FIG. 1 is a perspective view showing a folding device according to an embodiment of the present invention.

Referring to this drawing, a folding device 900 includes a web supply unit 100 to supply a web 110 having plate-shaped unit cells 112 arranged at the top of a separation film 116 at predetermined intervals, a winding jig 200 to rotate the unit cells 112 while holding a first one of the unit cells 112 of the web 110 so that the unit cells 112 are sequentially stacked in a state in which the separation film 116 is disposed between the respective unit cells 112, a Y-axis directional rotary shaft compensation unit 300 to compensate for the position of a rotary shaft of the winding jig 200 in a direction (Y-axis direction) perpendicular to an advancing direction of the web, and an X-axis directional rotary shaft compensation unit 400 to compensate for the position of the rotary shaft of the winding jig 200 in the advancing direction of the web 100 (X-axis direction).

Also, the Y-axis directional rotary shaft compensation unit 300 periodically changes the position of the rotary shaft in the direction (Y axis) perpendicular to the advancing direction (X axis) of the web to minimize vertical amplitude of the web 110 during winding.

The winding jig 200 is configured to fixedly hold the upper end of one of the unit cells 112 and the lower end of the separation film 114 corresponding to one of the unit cells 112. When the upward or downward position of the separation film 114 is changed, the Y-axis position of the rotary shaft is changed in a direction to offset such change.

The X-axis directional rotary shaft compensation unit 400 periodically changes the position of the rotary shaft to compensate for the change in X-axis velocity Vx of the web 110 caused during winding of the plate-shaped unit cells 112, thereby uniformly maintaining tension of the web 110.

Consequently, the compensation in X-axis directional position and the compensation in Y-axis directional position of the rotary shaft of the winding jig 200 are simultaneously performed. The compensation in position of the rotary shaft of the winding jig 200 is performed in an oval shape in which an X-axis direction is the major axis and a Y-axis direction is the minor axis during winding.

Figure 2:
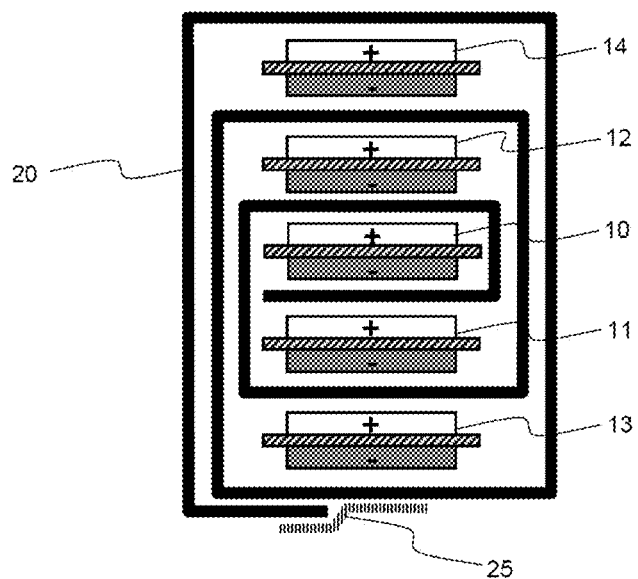
FIGS. 2 and 3 are typical views showing an exemplary structure of a stacked/folded type electrode assembly manufactured by winding full cells and a process of winding full cells to manufacture a stacked/folded type electrode assembly.
Figure 3:
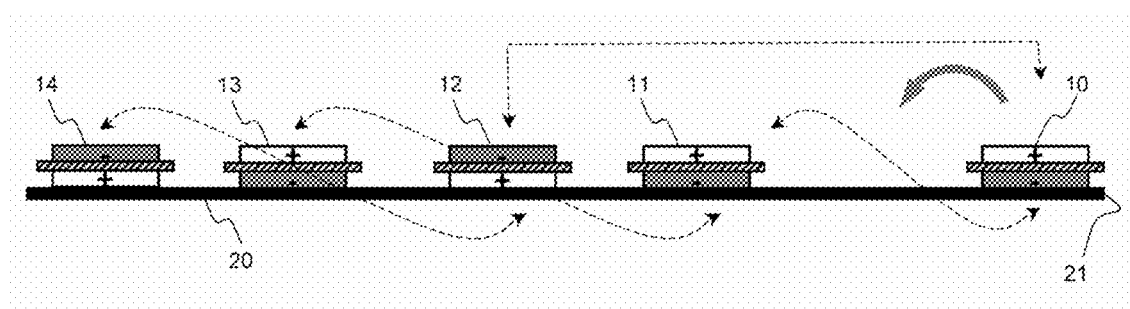

FIGS. 2 and 3 are typical views showing an exemplary structure of a stacked/folded type electrode assembly manufactured by winding full cells and a process of winding full cells to manufacture a stacked/folded type electrode assembly.

Referring to these drawings, full cells 10, 11, 12, 13, and 14, each of which has a cathode/separator/anode sequentially disposed, as unit cells, are overlapped, and a separation film 20 is disposed between the overlapped full cells. The separation film 20 has a unit length to wrap each of the full cells. The separation film 20 is folded inside at every unit length to successively wrap the respective full cells from the middle pull cell 10 to the outermost full cell 14 so that the separation film 20 is disposed between the overlapped full cells. The end of the separation film 20 is thermally welded or an adhesive tape 25 is attached to the end of the separation film 20. Also, the cathode and the anode are configured so that a cathode active material and an anode active material are applied to each main surface of an electrode sheet. For the sake of convenience, however, the cathode active material and the anode active material are not shown in FIGS. 2 and 3.

The stacked/folded type electrode assembly with the above-stated construction is manufactured by arranging the full cells 10, 11, 12, 13, and 14 on the long separation film 20 and sequentially winding the full cells 10, 11, 12, 13, and 14 from one end 21 of the separation film 20.

In arrangement of the full cells 10, 11, 12, 13, and 14 as unit cells, the first full cell 10 and the second full cell 11 are spaced apart from each other by a distance corresponding to at least one full cell. During winding, therefore, the outer surface of the first full cell 10 is fully wrapped by the separation film 20, and then a lower end electrode (anode) of the first full cell 10 comes into contact with an upper end electrode (cathode) of the second full cell 11.

The length of the separation film 20 to wrap the full cells 12, 13, and 14 after the second full cell 11 is increased during sequential stacking performed by winding. For this reason, the full cells are disposed so that the distance therebetween is sequentially increased in the winding direction.

Also, the full cells 10, 11, 12, 13, and 14 are configured so that cathodes and anodes face each other at the interface between the stacked full cells during winding. Consequently, the first full cell 10 and the second full cell 11 are full cells each having a cathode as an upper end electrode, the third full cell 12 is a full cell having an anode as an upper end electrode, the fourth full cell 13 is a full cell having a cathode as an upper end electrode, and the fifth full cell 14 is a full cell having an anode as an upper end electrode. That is, the full cells 11 and 13, each of which having a cathode as an upper end electrode, and the full cells 12 and 14, each of which having an anode as an upper end electrode, are alternately arranged except for the first full cell 10. Meanwhile, although not shown, in a case in which bicells are used as unit cells, the bicells are provided so that the bicells are alternately arranged every two bicells.

Figure 4:
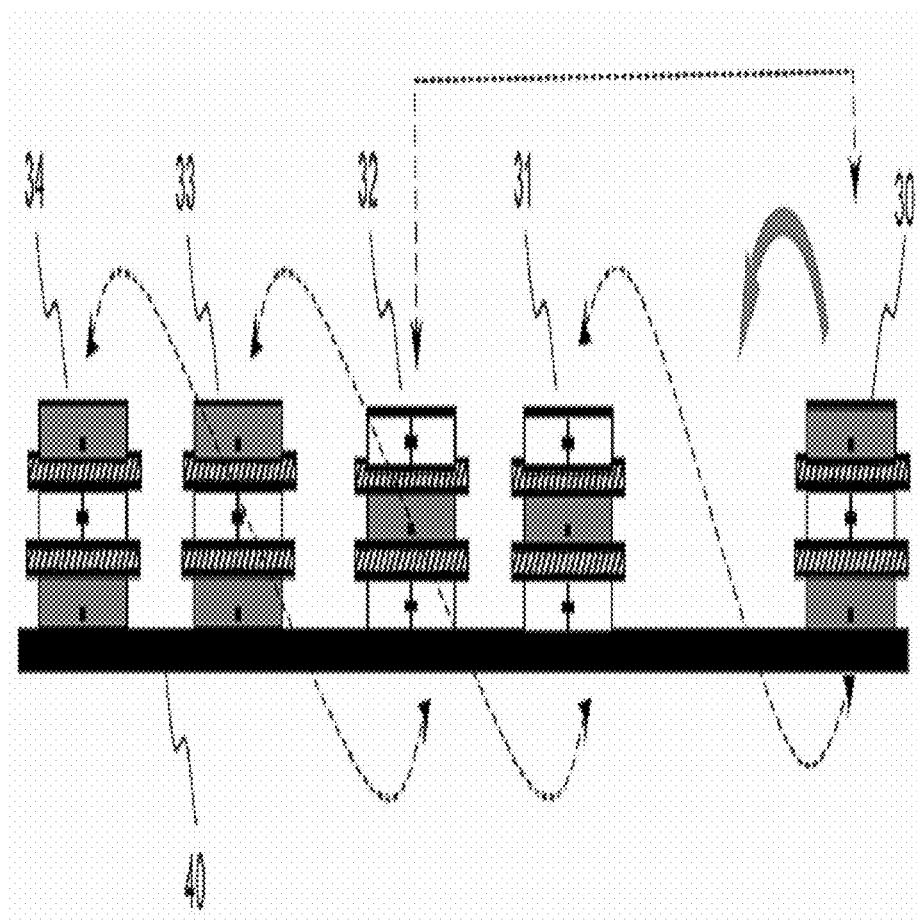
FIG. 4 is a typical view showing a process of winding bicells to manufacture a stacked/folded type electrode assembly.

FIG. 4 is a typical view showing a process of winding bicells to manufacture a stacked/folded type electrode assembly.

Referring to FIG. 4, bicells 30, 31, 32, 33, and 34, each of which has a cathode/separator/anode/separator/cathode or anode/separator/cathode/separator/anode sequentially disposed, as unit cells, are disposed on a separation film 40, and the bicells 30, 31, 32, 33, and 34 are sequentially wound from the first bicell 30 to manufacture a stacked/folded type electrode assembly.

In arrangement of the bicells 30, 31, 32, 33, and 34 as unit cells, the first bicell 30 and the second bicell 31 are spaced apart from each other by a distance corresponding to at least one bicell. During winding, therefore, the outer surface of the first bicell 30 is fully wrapped by the separation film 40, and then a lower end electrode (anode) of the first bicell 30 comes into contact with an upper end electrode (cathode) of the second bicell 31.

The length of the separation film 40 to wrap the bicells 30, 31, 32, 33, and 34 after the second bicell 31 is increased during sequential stacking performed by winding. For this reason, the bicells are disposed so that the distance therebetween is sequentially increased in the winding direction.

Also, the bicells 30, 31, 32, 33, and 34 are configured so that cathodes and anodes face each other at the interface between the stacked bicells during winding. In a preferred example, the first bicell 30 has an anode as an external electrode, the second bicell 31 and the third bicell 32 have a cathode as an external electrode, and the fourth bicell 33 and the fifth bicell 34 have an anode as an external electrode. That is, the bicells 31 and 32 having a cathode as an external electrode and the bicells 33 and 34 having an anode as an external electrode are alternately arranged every two bicells except for the first bicell 30.

Figure 5:
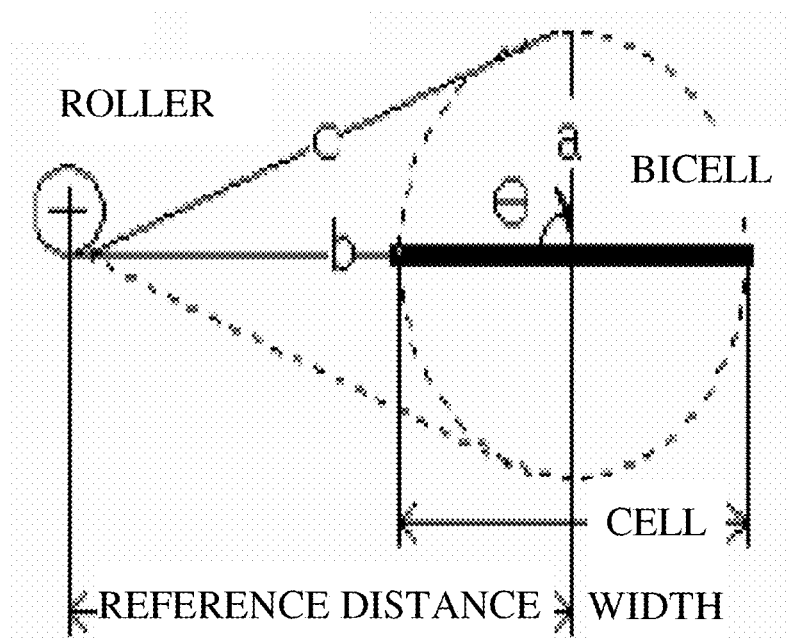
FIG. 5 is a typical view showing calculation of change in length of a web due to a rotational motion of a winding jig.

FIG. 5 is a typical view showing calculation of change in length of a web due to a rotational motion of a winding jig.

Referring to FIG. 5, a turning radius of a winding jig is a, the straight distance from a roller, which is a supply unit, to the center of rotation of the winding jig is b, and the length of a web from the roller based on an angle of the winding jig is c. c may be represented by the following equation based on the change of an angle θ of the winding jig with respect to an X axis.

$$c=(a^2+b^2-2ab \cos \theta)^{1/2}$$

$c_0$ when θ=0 may be subtracted from c to calculate a length change amount of the web.

Figure 6:
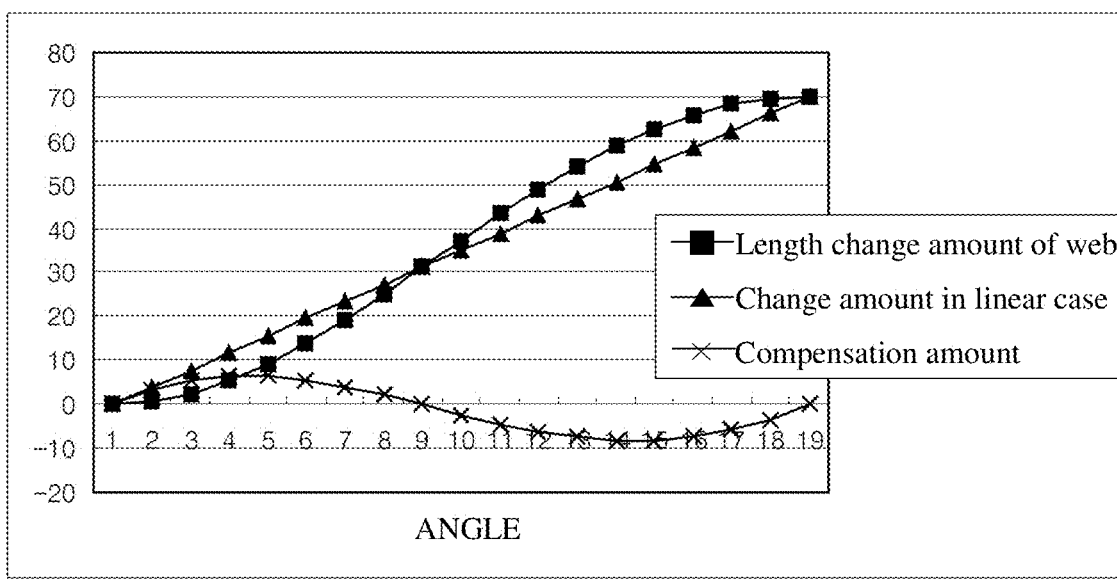
FIG. 6 is a graph showing a length change amount of a web during a rotational motion, a linear change amount of the web, and a compensation amount of the web based on a rotational angle θ.

FIG. 6 is a graph showing a length change amount of a web during a rotational motion, a linear change amount of the web, and a compensation amount of the web based on a rotational angle θ.

Referring to FIG. 6, there is shown a length change amount (linear change amount) of the web in a case in which a graph when the length of the web is uniformly increased according to the rotational angle is a linear. In this case, Vx is uniform. Since the winding jig and the wound unit cells are formed in a plate shape, however, the length change amount of the web deviates from the linear change amount during rotation although the final change amount is equal as in the value calculated by the above equation.

To eliminate such a deviation, the linear change amount is subtracted from the length change amount of the web to calculate a compensation amount.

Figure 7:
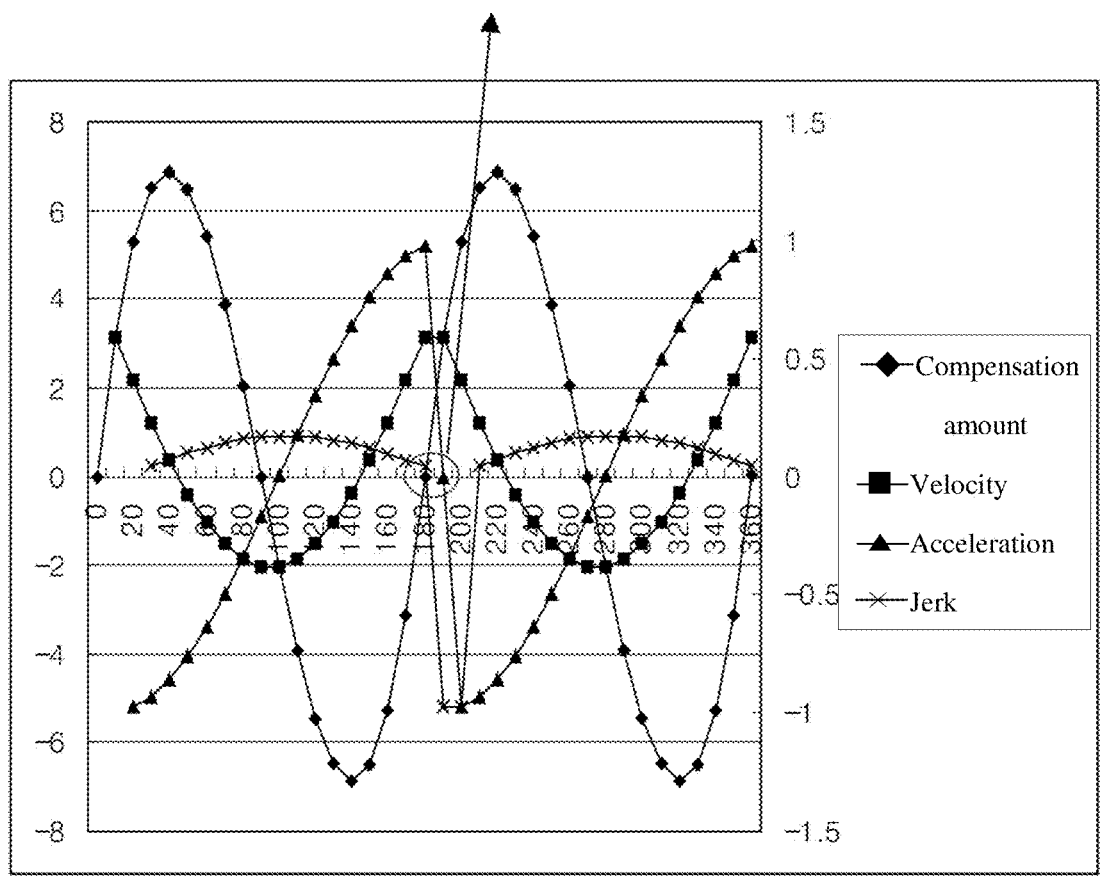
FIG. 7 is a graph showing the compensation amount, velocity, acceleration, and a jerk based on the rotational angle θ.

FIG. 7 is a graph showing the calculated compensation amount, velocity, acceleration, and a jerk based on the rotational angle θ.

Referring to FIG. 7, the compensation amount graph is similar to a continuous function. However, a point which cannot be differentiated occurs around 180 degrees. A differential value of displacement is velocity. As in the velocity graph of FIG. 6, therefore, an angular point occurs. As a result, acceleration is abruptly changed, resulting in an excessive jerk.

Using such a compensation method, therefore, it is difficult to increase rotational velocity for improving process efficiency.

Figure 8:
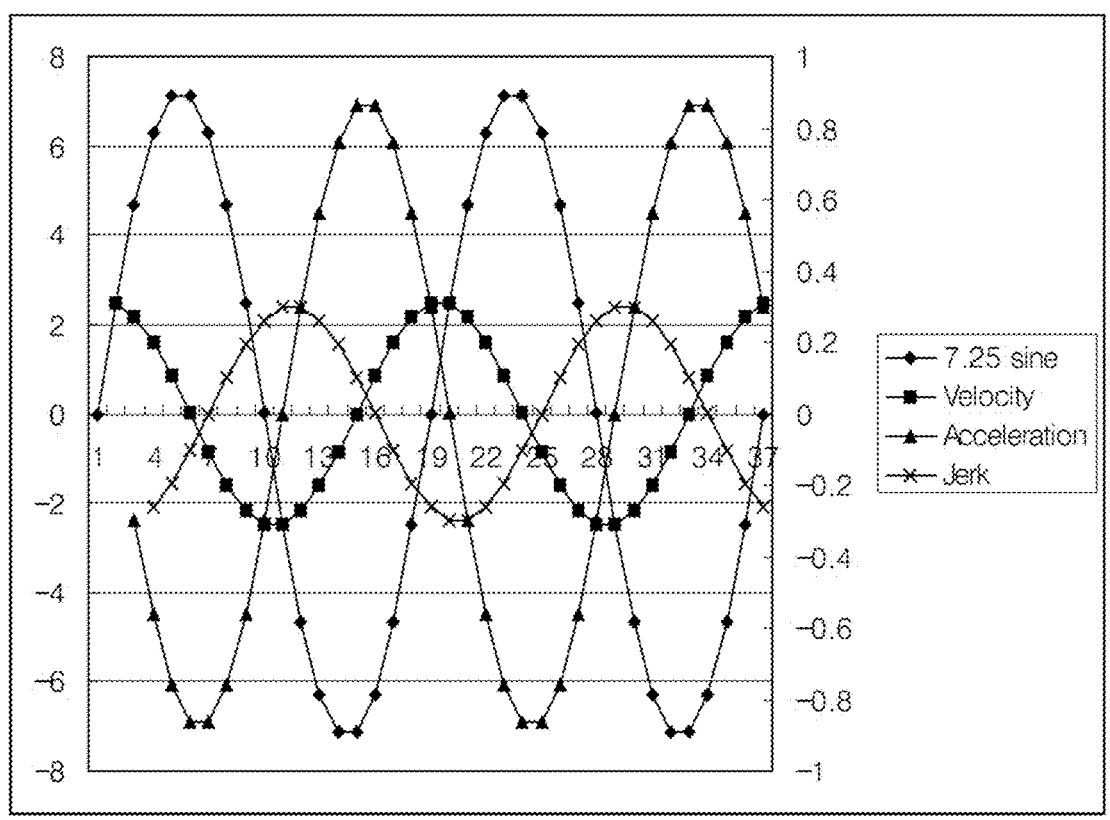
FIG. 8 is a graph showing the compensation amount, the velocity, the acceleration, and the jerk based on the rotational angle θ in a case in which compensation is performed using a periodic function.

FIG. 8 is a graph showing the compensation amount, the velocity, the acceleration, and the jerk based on the rotational angle θ in a case in which compensation is performed using a periodic function (7.25 sine function).

Referring to FIG. 8, the compensation amount graph is similar to a periodic function graph, i.e. a sine function graph. When a 7.25 sine function graph is properly selected for compensation, therefore, it can be seen that differentiation is possible at every position of the compensation amount graph, and both the velocity and acceleration graphs are continuous, as shown in the graph of FIG. 8. Also, the jerk does not deviate from a predetermined range, and therefore, it is not necessary to compensate for torque due to the excessive jerk.

Figure 9:
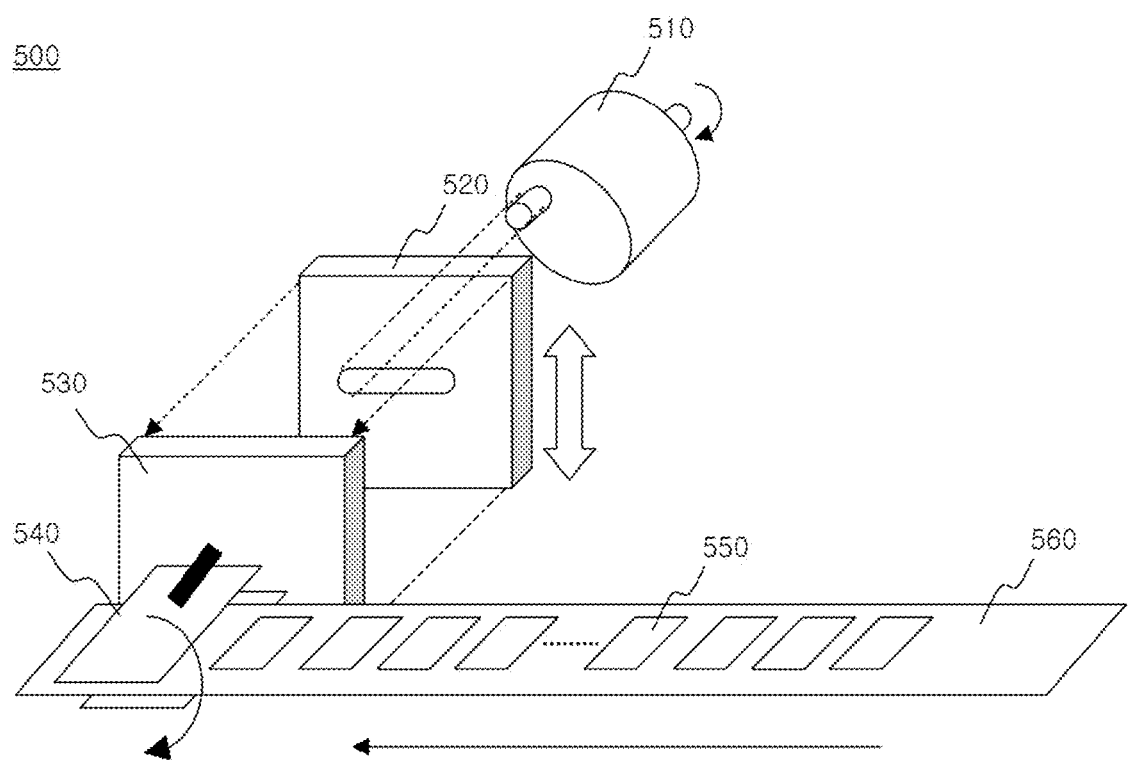
FIG. 9 is a schematic typical view showing a folding device according to an embodiment of the present invention.

FIG. 9 is a schematic typical view showing a folding device according to an embodiment of the present invention.

Referring to FIG. 9, a folding device 500 includes a rotary shaft compensation unit and a winding unit. The rotary shaft compensation unit is configured to have an interconnected variable rotation structure. The rotary shaft compensation unit includes a rotary eccentric roller 510 and a variable crank 520 to convert a rotational motion of the eccentric roller 510 into a rectilinear motion.

At a portion of the variable crank 520 with which an eccentric shaft of the eccentric roller 510 engages is formed a groove extending in the horizontal direction by a rotational diameter of the eccentric shaft. Although not shown, the variable crank 520 is configured so that the movement of the variable crank 520 in the horizontal direction is restrained.

Consequently, the rotational motion transmitted through the eccentric roller 510 does not move the variable crank 520 in the horizontal direction but is converted into a vertical rectilinear motion through the groove.

The variable crank 520 of the rotary shaft compensation unit is operatively connected to the winding unit 530 having a winding jig 540 mounted thereto to compensate for a rotary shaft of the winding jig 540 in the vertical direction.

In this case, vertical fluttering of a web having unit cells 550 arranged on a separation film 560 during winding the web using the winding jig 540 is reduced. As a result, it is possible to prevent scattering of an electrode material due to vertical vibration.

Figure 10:
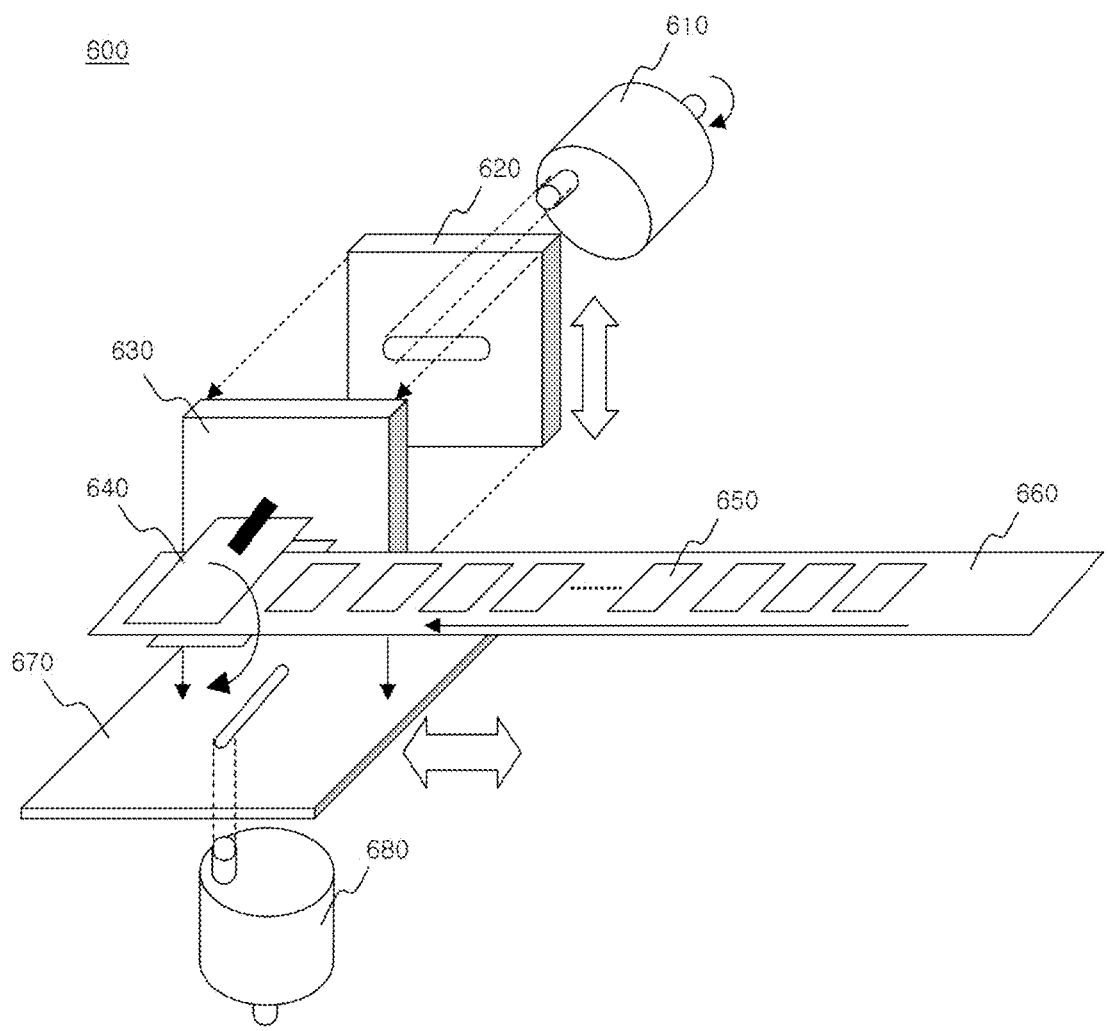
FIG. 10 is a schematic typical view showing a folding device according to another embodiment of the present invention.

FIG. 10 is a schematic typical view showing a folding device according to another embodiment of the present invention.

Referring to FIG. 10, a folding device 600 includes a Y-axis compensation unit, an X-axis compensation unit, and a winding unit. The Y-axis compensation unit and the winding unit are identical to those shown in FIG. 9, and therefore, a detailed description thereof will be omitted. The X-axis compensation unit is configured to have an interconnected variable rotation structure. The X-axis compensation unit includes a rotary eccentric roller 680 and a variable crank 670 to convert a rotational motion of the eccentric roller 680 into a rectilinear motion.

The X-axis compensation unit may be disposed opposite to the Y-axis compensation unit or may be disposed perpendicular to the Y-axis compensation unit. At a portion of the variable crank 670 with which an eccentric shaft of the eccentric roller 680 engages is formed a groove extending in a direction perpendicular to a web feeding direction by a rotational diameter of the eccentric shaft. Consequently, the variable crank 670 is not moved in the direction perpendicular to the web feeding direction but performs a rectilinear motion only in the web feeding direction through the groove. This rectilinear motion is performed by rotation of the eccentric shaft of the eccentric roller 680. Consequently, the rectilinear motion is performed in the form of a periodic function.

The variable cranks 620 and 670 of the Y-axis compensation unit and the X-axis compensation unit are operatively connected to the winding unit 630 having a winding jig 640 mounted thereto to compensate for a rotary shaft of the winding jig 640 in the vertical direction and in the horizontal direction.

In this case, feeding velocity of a web having unit cells 650 arranged on a separation film 660 during winding the web using the winding jig 640 is uniformly maintained. In addition, vertical fluttering of the web is reduced.

Figure 11:
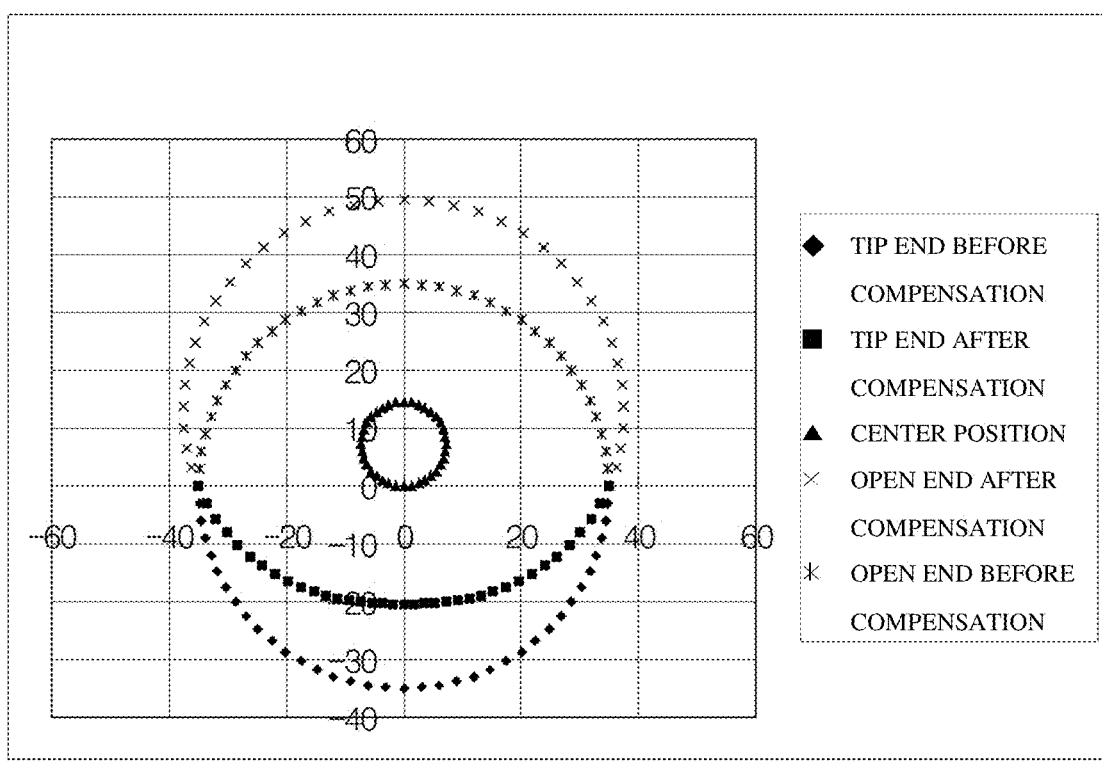
FIG. 11 is a graph showing upper and lower compensation displacement in a case in which the folding device according to the present invention is used.

FIG. 11 is a graph typically showing vertical compensation displacement in a case in which the folding device according to the present invention is used.

Referring to FIG. 11, a mandrel of the winding jig is rotated in the clockwise direction to manufacture an electrode assembly. A web is supplied from the right side of the graph. The mandrel is configured to have a flat structure including a tip end applying rotational force to the web and an open end opposite to the tip end.

In a case in which vertical compensation is not applied, the mandrel performs a circular motion having a diameter corresponding to the length of the mandrel about a rotary shaft thereof. In this case, the web is changed vertically downward by a length corresponding to a radius of the circle formed by the mandrel.

In a case in which vertical compensation is applied, on the other hand, the tip end of the mandrel is moved vertically upward by a length corresponding to a vertical compensation amount of the rotary shaft (center position) with the result that the change amount of the web is reduced by a length corresponding to the vertical compensation amount.

In FIG. 11, the mandrel has a width of 70 mm, and the vertical compensation amount of the web before compensation was 35 mm. In a case in which vertical compensation of 15 mm was applied, the vertical compensation amount of the web was 20 mm.

Hereinafter, the present invention will be described in more detail based on examples; however, the following examples are given only to illustrate the present invention, and therefore, the scope of the present invention is not limited to the experiments.

Example 1

A folding device having an X-axis compensation unit and a Y-axis compensation unit installed at a winding jig having a mandrel, width of which was 65.2 mm, was manufactured.

Comparative Example 1

A folding device was manufactured according to the same method as Example 1 except that the Y-axis compensation unit installed was not installed Experimental Example 1

High-speed folding of 34 ppm was performed using the folding devices according to Example 1 and Comparative example 1. The displacement of a web distant from the tip end of the width of the mandrel by 150 mm was measured. The measurement results are indicated in Table 1 below.

TABLE 1

|  | Top dead point | Bottom dead point | Fluttering |
|---|---|---|---|
| Example 1 | 261 mm | 228 mm | 32 mm |
| Comparative example 1 | 263 mm | 217 mm | 46 mm |

It can be seen from Table 1 that fluttering of the web using the folding device according to Example 1 in which Y-axis compensation was carried out is less than that of the web using the folding device according to Comparative example 1. This is because the fluttering of the web was reduced through vertical compensation. As a result, it is possible to restrain quality deterioration due to scattering of active materials even in high-speed folding.

INDUSTRIAL APPLICABILITY

As is apparent from the above description, a folding device according to the present invention is configured to include a Y-axis directional rotary shaft compensation unit to compensate for the position of a rotary shaft of a winding jig in a Y-axis direction. Consequently, it is possible to prevent separation of electrode active materials from unit cells or generation of dust during a folding process even when winding velocity is increased to improve process efficiency, thereby greatly improving quality of an electrode assembly.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A folding device to manufacture a stacked/folded type electrode assembly having unit cells sequentially stacked in a state in which a separation film is disposed between the respective unit cells, the folding device comprising:
   a web supply unit to supply a web having plate-shaped unit cells arranged at a top of a separation film at predetermined intervals;
   a winding jig to rotate the unit cells while holding a first one of the unit cells of the web so that the unit cells are sequentially stacked in a state in which the separation film is disposed between the respective unit cells; and
   a Y-axis directional rotary shaft compensation unit to compensate for a position of a rotary shaft of the winding jig in a direction (Y-axis direction) perpendicular to an advancing direction of the web, wherein
   the Y-axis directional rotary shaft compensation unit periodically changes the position of the rotary shaft in the direction (Y axis) perpendicular to the advancing direction (X axis) of the web to minimize vertical amplitude of the web during winding, and
   wherein, when the upward or downward position of the web is changed, the Y-axis position of the rotary shaft is changed in a direction to offset the change.

2. The folding device according to claim 1, wherein the unit cells are bicells or full cells.

3. The folding device according to claim 1, wherein the unit cells are disposed on the separation film so that the separation film has a spaced region having a length corresponding to a size of each of the unit cells since no unit cell is arranged at a region of the separation film adjacent to a first one of the unit cells, and the spaced region wraps a front surface and a rear surface of the first one of the unit cells during folding to maintain electrical separation between the respective unit cells.

4. The folding device according to claim 2, wherein, in a case in which the unit cells are the bicells, the bicells are disposed on the separation film so that different types of bicells are adjacent to each other at a lower end of each of the bicells.

5. The folding device according to claim 2, wherein, in a case in which the unit cells are the full cells, the full cells are disposed on the separation film so that different electrode surfaces face the same surface (front surface) at a lower end of each of the full cells.

6. The folding device according to claim 1, wherein the winding jig is configured to fixedly hold the web at an upper end of one of the unit cells and a lower end of the separation film corresponding to one of the unit cells.

7. The folding device according to claim 1, further comprising an X-axis directional rotary shaft compensation unit to compensate for the position of the rotary shaft of the winding jig in the advancing direction of the web (X-axis direction).

8. The folding device according to claim 7, wherein the X-axis directional rotary shaft compensation unit periodically changes the position of the rotary shaft to compensate for the change in X-axis velocity (Vx) of the web caused during winding of the plate-shaped unit cells, thereby uniformly maintaining tension of the web.

9. The folding device according to claim 7, wherein the compensation in X-axis directional position and the compensation in Y-axis directional position of the rotary shaft of the winding jig are simultaneously performed.

10. The folding device according to claim 9, wherein the compensation in position of the rotary shaft of the winding jig is performed in an oval shape in which an X-axis direction is the major axis and a Y-axis direction is the minor axis during winding.

11. The folding device according to claim 1, wherein the Y-axis directional rotary shaft compensation unit is configured to have an interconnected variable rotation structure.

12. The folding device according to claim 7, wherein the Y-axis directional rotary shaft compensation unit and the X-axis directional rotary shaft compensation unit are configured to have an interconnected variable rotation structure.

* * * * *